United States Patent [19]

Nozaki

[11] Patent Number: 5,386,554

[45] Date of Patent: Jan. 31, 1995

[54] METHOD AND APPARATUS FOR REDUCING DATA LOCKING TIME BY REMOVING A LOCK WHEN JOURNAL DATA IS WRITTEN INTO A MAIN MEMORY JOURNAL QUEUE

[75] Inventor: Masaharu Nozaki, Tokyo, Japan

[73] Assignee: Kabushiki Kaisha Toshiba, Kawasaki, Japan

[21] Appl. No.: 700,862

[22] Filed: May 16, 1991

[30] Foreign Application Priority Data

May 18, 1990 [JP] Japan .................. 2-126793

[51] Int. Cl.$^6$ .............................. G06F 15/40
[52] U.S. Cl. .................. 395/600; 364/DIG. 1; 364/222.82; 364/265.3; 364/266.5
[58] Field of Search .............. 395/600, 650, 700, 725; 371/12, 16.5

[56] References Cited

U.S. PATENT DOCUMENTS

| | | | |
|---|---|---|---|
| 4,159,517 | 6/1979 | Paradine et al. | 395/600 |
| 4,507,751 | 3/1985 | Gawlick et al. | 395/600 |
| 4,819,156 | 4/1989 | DeLorme et al. | 395/600 |
| 4,945,474 | 7/1990 | Elliott et al. | 395/600 |
| 5,151,988 | 9/1992 | Yamagishi | 395/600 |

OTHER PUBLICATIONS

Gray, J., "Notes on Data Base Operating Systems", Operating Systems, an Advanced Course, 1977 pp. 394-481.

Primary Examiner—Thomas G. Black
Assistant Examiner—John C. Loomis
Attorney, Agent, or Firm—Oblon, Spivak, McClelland, Maier & Neustadt

[57] ABSTRACT

A data management system, which is equipped with a data file and a journal file and adapted to reserve the exclusive occupation for data and then update the data, is characterized by releasing the exclusive occupation of data prior to writing of a journal to the journal file and of corresponding updated data to the data file. When data on a data base is updated, the exclusive occupation states of data to be updated are reserved first and then updating of the data is executed on a data buffer placed on a main memory and journals on the updating of the data are collected. The collected journals are entered into a first-in first-out journal queue in units of transactions. The exclusive occupation states of data on a corresponding transaction is released after corresponding journals have been stored in the journal queue. The journals stored in the journal queue are written to the journal file in units of transactions in the order in which they are entered into the queue. Subsequently updated data is written to the data file. The data in the data file is restored using the journal file when a system failure occurs in the data base.

20 Claims, 6 Drawing Sheets

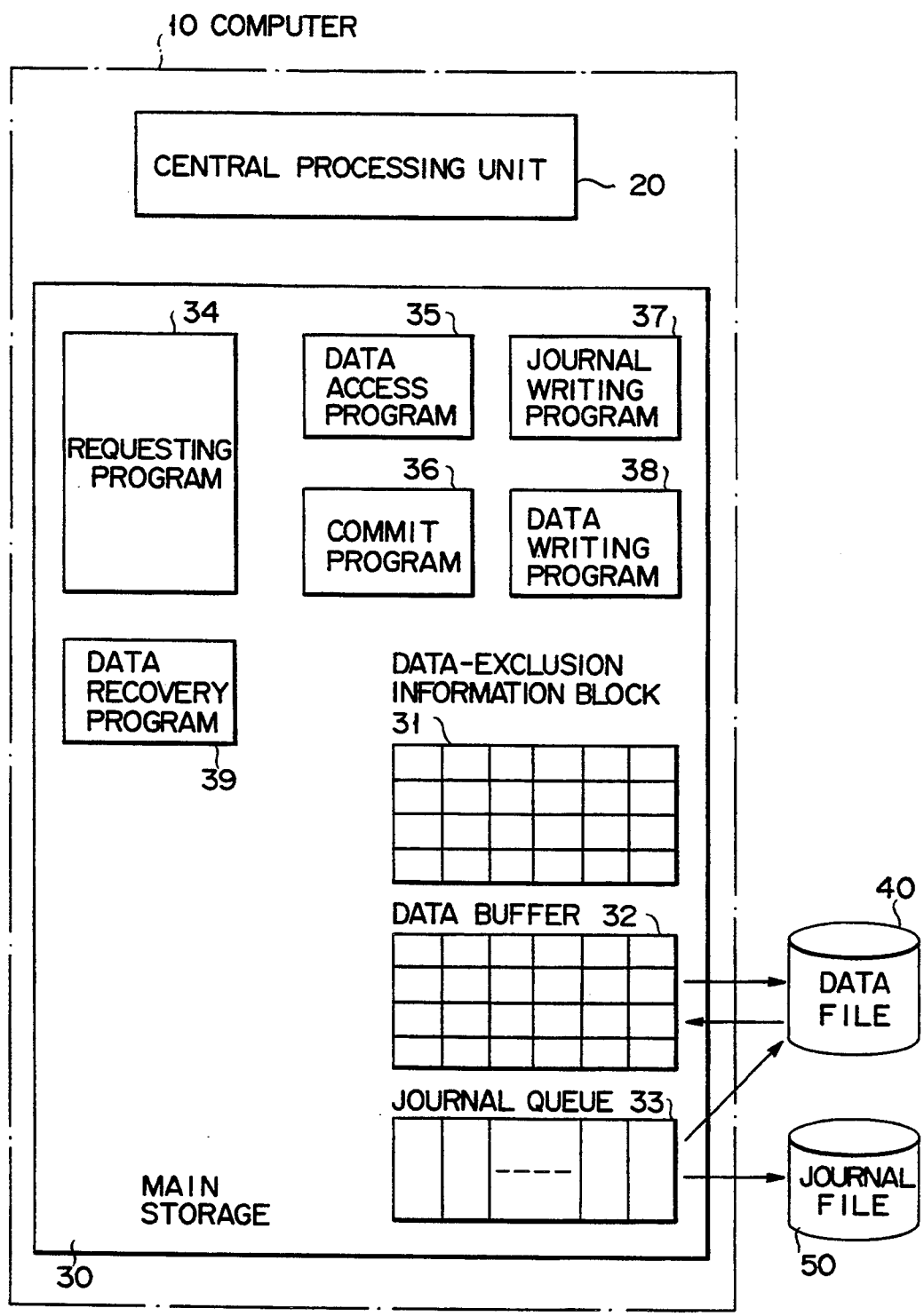
F I G. 2

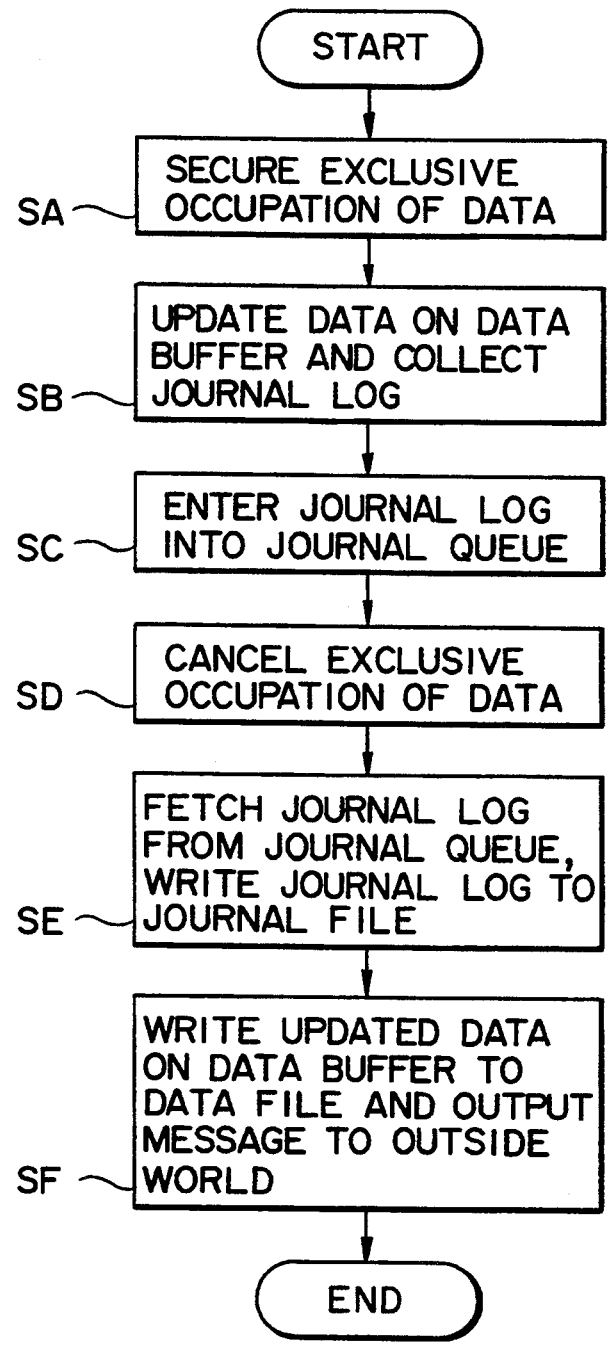
F I G. 4

METHOD AND APPARATUS FOR REDUCING DATA LOCKING TIME BY REMOVING A LOCK WHEN JOURNAL DATA IS WRITTEN INTO A MAIN MEMORY JOURNAL QUEUE

BACKGROUND OF THE INVENTION

1. Field of the Invention

The present invention relates to a data management system, such as a database, which handles data files and, more particularly, to a data management system and method which are adapted to generate journals or on-line journals or logs at high speed.

2. Description of the Related Art

A data management system which manages data files is required to guarantee four requirements for transactions. The data files here include a relative file, an indexed file, an indexed sequential file, a relational database, a network database, a hierarchical database and so on. A transaction refers to a processing unit involving a set of requests for making a reference to (reading from) and updating (writing into) the data file in order to carry out a certain program. In other words, the transaction refers to a series of operations including entering a message from a terminal, updating a data base and outputting a message to the terminal. The four requirements for transaction are atomicity, consistency, isolation and durability. The atomicity means that the result of a transaction is either success or failure (commitment or cancellation) as a whole. The consistency means that the state of data is changed to a new consistent one at the time of success of the transaction. The isolation is to isolate an intermediate effect of the transaction from another transaction (place it in the invisible state). The durability means the recoverability from a fault.

In order to meet the above four requirements for transaction, a conventional data management system employs a journaling system with the following procedures. When a requesting program makes a request for data access to a data file, it reserves exclusive occupation of data. The exclusive occupation of data means that, even when an access request is made by another program, access to the data is not allowed until the exclusive occupation is released. Subsequently the data is updated on a data buffer secured on main memory and a journal is collected. The journal is then written to a journal file. The updated data on the data buffer is subsequently written to a data file. The exclusive occupation of data is released after the writing of it to the data file. After the exclusive occupation is released, another requesting program is allowed to make a request for data access to the data file.

However, a problem with the journaling system is that a period of the exclusive occupation of data is long. To overcome the problem, a journaling system with the following procedures is proposed by the inventors and will now be considered. According to this journaling system, the exclusive occupation of data is released immediately after the writing of a journal to the journal file. Hence, the exclusive occupation time can be shortened by the time required to write updated data to the data file.

With the above two systems, where a requesting program intends pieces of data to have consistency, the exclusive occupation of these pieces of data is reserved and journals are collected, after that, subsequent processing is performed for the pieces of data.

A recent decrease in memory cost results in an increase in the capacity of main memory of a computer. For this reason, there is a strong possibility that data to be accessed in the data file will be present at the data buffer on the main storage. Thus, in many cases the processes of updating data and collecting journals on the data buffer will depend solely on operations on the main storage.

On the other hand, the process of writing a journal to the journal file and the process of writing updated data on the data buffer to the data file require access to an external storage unit. Access to the external storage unit takes a long time in comparison with operations on the main storage. With the two systems described above, therefore, the data occupation time becomes long.

In the case where many requesting programs run concurrently, when the occupation time of each program is long, the probability of the occurrence of exclusive-occupation contention between the programs increases, so that the system efficiency is decreased.

In the two systems, the writing of journals to the journal file for several requesting programs may be performed at one time. However, this process requires to be performed quickly because it is performed during exclusive occupation time. Thus, there is little possibility that journals can be batch-written (written in a group), and a quantity of data that is batch-written cannot be made large.

SUMMARY OF THE INVENTION

It is accordingly an object of the present invention to provide a data management system and method which permit an exclusive occupation time for data to be decreased.

It is the object of the present invention to provide an improved data management system and method.

According to an aspect of the present invention, there is provided a data management system equipped with a data file and a journal file and adapted to secure exclusive occupation of data and then update the data, comprising:

access means for reserving exclusive occupation state of data to update it, updating the data on a date buffer placed on a main memory and collecting its journal;

releasing means for storing journals collected by said access means in a fast-in fast-out journal queue in units of transactions and releasing the exclusive occupation of data at the completion of the storing of said journals;

journal writing means for writing journals stored in said journal queue for each of said transactions to said journal file in the order in which they are stored in said journal queue; and data writing means for writing updated data on a transaction whose journals have been written to said journal file, which is present on said data buffer, to said data file.

The data management system of the present invention, upon storing journals for one transaction in the journal queue, releases the exclusive occupation states for corresponding data. Thus, the exclusive occupation of data is released prior to the writing of journals to the journal file and the writing of updated data on the data buffer to the data file. Moreover, the data management system writes journals for each of transactions from the journal queue to the journal file in a group in the order in which they are entered into the queue. Therefore, the exclusive occupation time can be made shorter than before and many journals can be written to the journal file in a group after they are stored in the journal queue, thereby fully showing the effectiveness of batch-writing of journals.

Moreover, according to the present invention, the writing of journals from the journal queue to the journal file is performed. The order of the writing corresponds with the order in which journals for each transaction are entered into the journal queue. For this reason, when a system fault occurs, the use of journals in the journal file permits the data file to be restored to the data-consistent state.

According to the other aspect of the present invention there is provided an online transaction processing method comprising the steps of:

requesting to update data on a data base having a plurality of data files which must not be inconsistent:

executing, in response to said requesting step, operations of reserving an exclusive occupation for a piece of data, updating the data and collecting a journal on updating of the data on a plurality of pieces of data, constituting one transaction, on said plurality of data files in sequence;

storing journals collected in said executing step in units of transactions;

releasing the exclusive occupation of the data related to the transaction in which journals are stored in said storing step;

writing the journals stored in said storing step to a journal file in units of transactions after the releasing of the exclusive occupation of the data; and writing updated data to said data files for transactions whose journals have been written to said journal file and outputting a message on updated data.

This data management method provides the same advantage as the data management system described above.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a system block diagram of the data management system shown in FIG. 1;

FIGS. 4 and 5 are a flowchart and a timing diagram, respectively, for use in explanation of main procedures of a journaling process in the embodiment of the present invention.

DETAILED DESCRIPTION OF THE PREFERRED EMBODIMENTS

Figure 1:
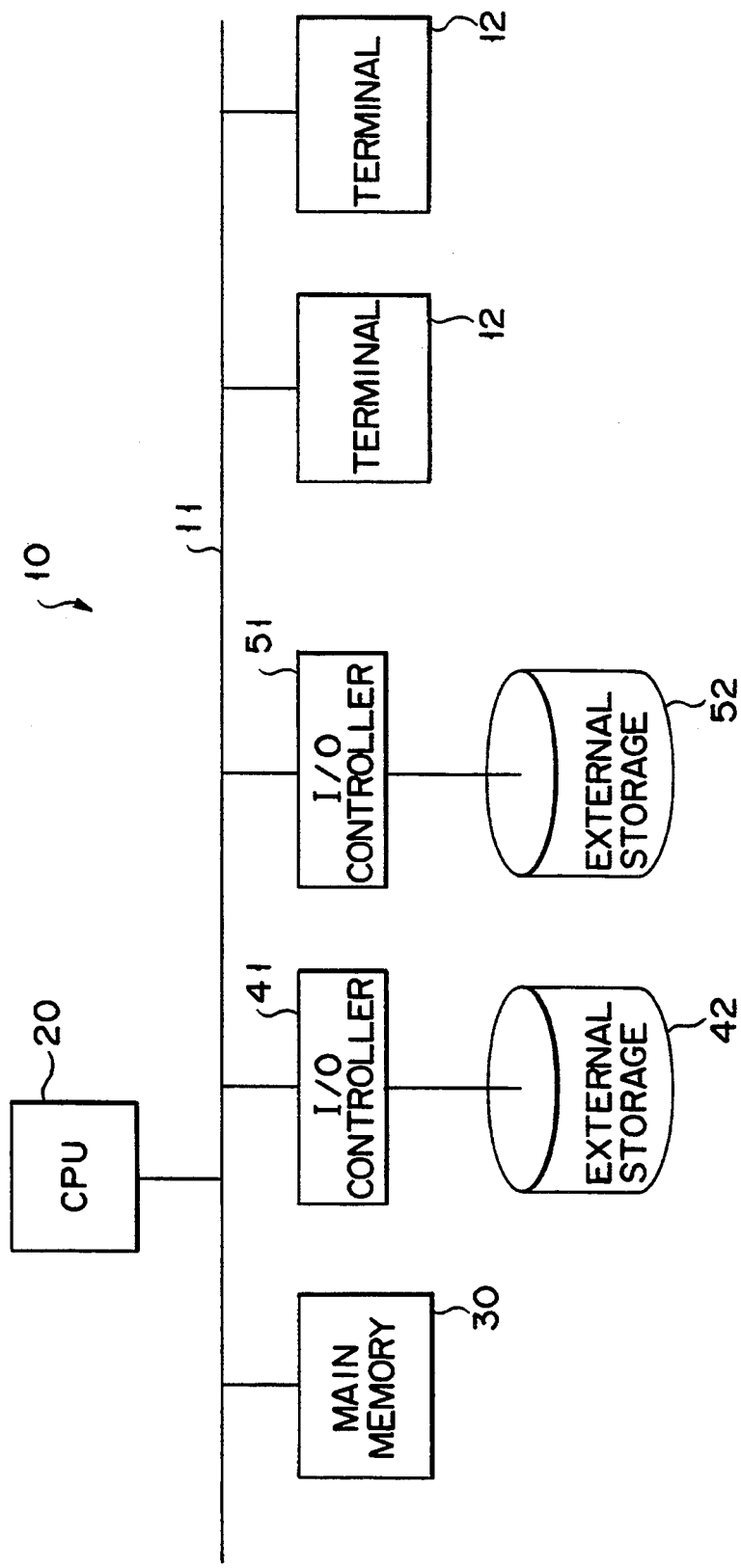
FIG. 1 is a block diagram illustrating a physical configuration of a data management system according to an embodiment of the present invention.

Hereinafter a data base system which is a data management system according to an embodiment of the present invention will be described with reference to the drawings.

The data management system 10 is constructed from a central processing unit (CPU) 20, a main memory 30, input/output controllers 41 and 51, terminals 12, a bus 11 which connects these components, and external storage units 42 and 52 which are connected to the input/output controllers 41 and 51, respectively. Each of the external storage units may comprise a magnetic disk unit.

FIG. 2 illustrates mainly the structure of data stored in the main memory 41 and the external storage unit 50. As illustrated in FIG. 2, the main memory 30 is provided with a data-exclusion information block a data buffer 32 and a journal queue 33. The data-exclusion information block 31 holds information indicating exclusive states of data (data-exclusion information). The data buffer 32 holds data required for processing in a data file 40. The journal queue 33 holds journals (logs) on updating of data and consists of a first-in first-out (FIFO) queue.

Programs placed in the main memory 30 include a requesting program 34, a data access program 35, a commit program 36, a journal writing program 37, a data writing program 38 and a data recovery program 39. The data access program 35 requests access to the data file 40. The requesting program 34 calls the commit program 36. The data access program 35 operates the data-exclusion information block 31 and the data buffer 32 so as to read data from the data file 40 to the data buffer 32. The commit program 36 operates the data-exclusion information block 31, the data buffer 32 and the journal queue 33 to terminate a transaction from the request program 34. The journal writing program 37 operates the journal queue 33 so as to write journals to the journal file 50. The data writing program 38 operates the data-exclusion information block 31, the data buffer 32 and the journal queue 33 so as to write updated data to the data file 40. The data recovery program 39 restores the data file 40 to the state that is consistent in data by the use of the journal file 50 and the data file 40.

The external storage unit 42, such as a magnetic disk unit, maintains the data file 40, while the external storage unit 50, such as a magnetic disk unit, maintains the journal file 50 for preserving journals about updating of data stored in the data file 40.

Figure 3:
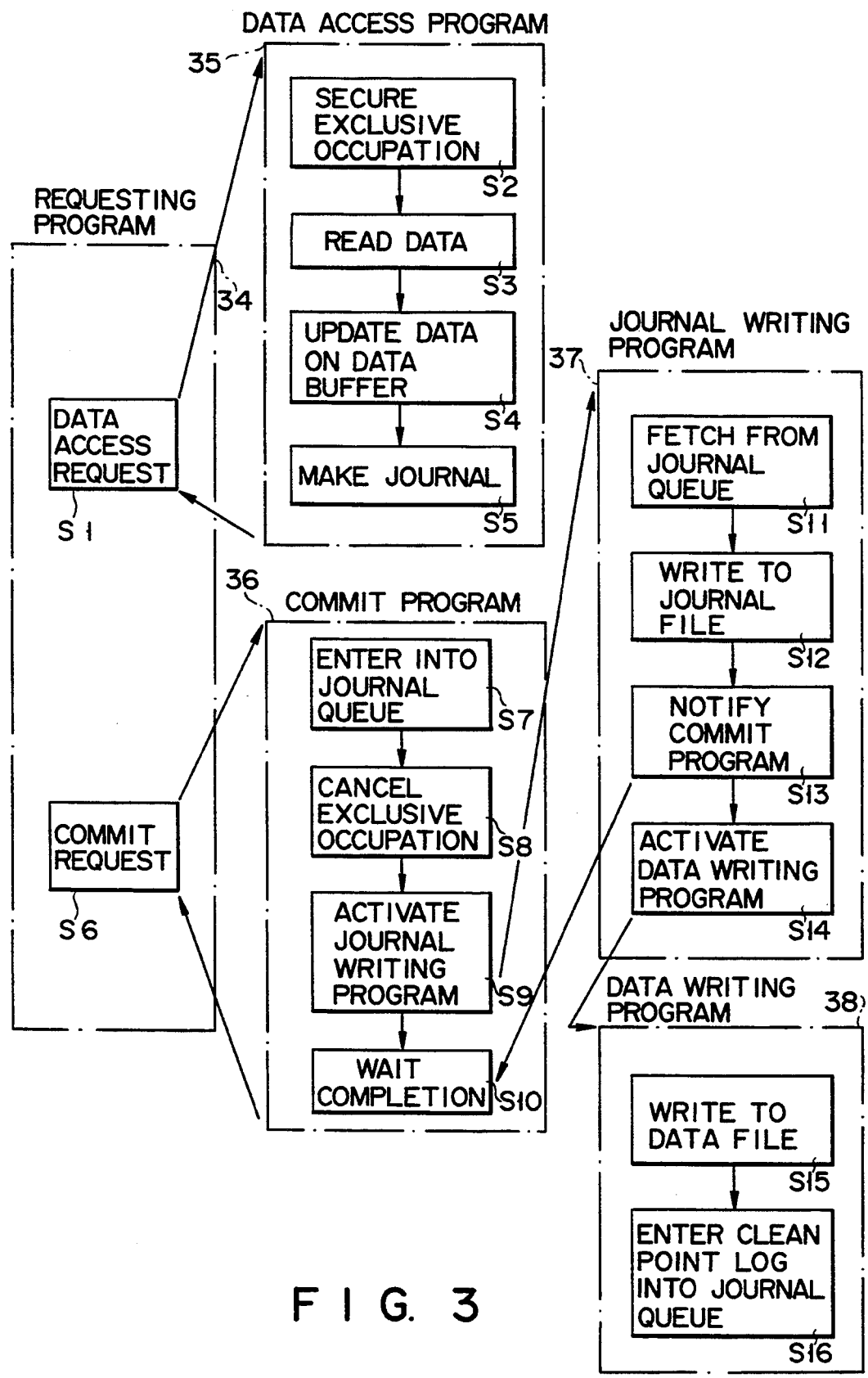
FIG. 3 is a flowchart for use in explanation of procedures of a program.

Next, the operation of the data management system shown in FIGS. 1 and 2 will be described with reference to a flowchart shown in FIG. 3.

When the data management system is instructed by the terminal 12 to update data, the central processing unit 20, by the request program 34, requests access to data in the data file 40, so that the data access program 35 is called (step S1).

By the data access program 35, the central processing unit 20 operates the data-exclusion information block 31 to reserve the exclusive occupation of an exclusion unit including requested data (data to be accessed) (step S2). For data processing of a file, the exclusion unit refers to a record, a block or a page. When the data requested by the data access program 35 is not present in the data buffer 32, the central processing unit 20 performs an operation for transferring the data from the data file 40 to the data buffer 32 (step S3). Furthermore, the central processing unit 20 updates the data on the data buffer 32 (step S4). The central processing unit 20 collects or makes a journal on updating of data and stores it in a temporary storage area on the main memory 30 (step S5). Subsequently the flow of control returns from the data access program 35 to the request program 34.

The central processing unit 20 executes sets of steps S1 to S5 repeatedly for the series of processing units (i.e., a transaction) involving a set of requests for access to data on the data file 40. When steps S1 to S5 for a transaction is terminated, the central processing unit 20, by the request program 34, outputs a commit request for informing the completion of the transaction, so that the commit program 36 is called (step S6).

By the commit program 36, the central processing unit 20 places or enters a set of journals collected in step S5 in the last of the journal queue 33 (step S7). Next, the central processing unit 20 operates the data-exclusion information block 31, by the commit program 36, thereby releasing a set of exclusive occupation which have been reserved in step S2 (step S8). Thereby, a data access to the same data block by another requesting program 34 is allowed. At the termination of step S8 the central processing unit 20 activates the journal writing program 37 (step S9) and places the commit program 36 in the wait state (step S10).

By the journal writing program which has been activated the central processing unit 20 fetches the journals stored in the journal queue 33 from its top (step S11). The central processing unit 20 subsequently writes the journals fetched to the journal file 50 (step S12).

In the present embodiment, as described above, the writing of the journals to the journal file 50 is performed after releasing of the exclusive occupation. For this reason, it becomes possible to defer the writing of journals to the journal file 50 until journals corresponding to several requesting programs have been stored in the journal queue 33. Thus, the number of times of access to the external storage unit 52 can be reduced and the effectiveness of batch-writing of journals can be heightened.

At the termination of the writing of the journals to the Journal file 50, the central processing unit 20, by the journal writing program 37, cancels the waiting state of the journal writing completion which has been set in step S10 for the journals (step S13). Thereby, the requesting program 34 is informed that the transaction has been completed.

Upon termination of step S13, the central processing unit 20 activates the data writing program 38 in accordance with the Journal writing program 37 (step S14).

The central processing unit 20 is responsive to the data writing program 38 to write updated data on the data buffer 32 which corresponds to the transaction whose journals have already be written to the data file 40 (step S15).

Next, the central processing unit 20 places in the journal queue 33 a clean point log indicating the completion of the writing of the updated data to the data file 40 about the transaction (step S16). The clean point log is written to the journal file 50 together with the journals when step S12 is executed next. The clean point log written to the journal file 50 indicates that the journals for the corresponding transaction placed in the journal queue 33 and updated data on the data buffer 32 have been written to the journal file 50 and the data file 40, respectively. Thus, for journals indicated by the clean point log and written to the journal file 50, there is no need to recovery data in the data file 40 using the journals after a system failure. This speeds up recovery of the data file 40 when a system failure occurs.

Moreover, necessary messages, for example, a message describing that data has been updated, the address of the updated data, the updated data and an information formed on the bases of the address and the update data, are transmitted to the outside world of the data management system 10 via a terminal, for example, in parallel with the run of the data writing program 38.

Next, a recovery process for the data file 40 when a fault occurs will be described.

The data recovery program 39 is activated so as to restore the data file 40 to the data-consistent state when the system failure occurs. In response to the data recovery program 39 the central processing unit 20 performs a data file recovery process using journals in the journal file 50. As to journals designated by a clean point log written in the journal file 50, corresponding data has already been written to the data file 40 on the external storage unit 42 which is a non-volatile memory. Thus, the recovery of the data is not needed. Thus, the journals designated by the clean point log are ignored. That is, the central processing unit 20 restores the data file 40 using only journals which are written to the journal file 50 but are not designated by a clean point log. In other words, the central processing unit 20 restores the data file 40 using only journals of a transaction whose data has not been written to the data file 40.

The order in which journals are written from the journal queue 33 to the journal file 50 corresponds with the order in which they are entered into the journal queue 33 (the order in which exclusive occupation of data are reserved) because the queue is of a FIFO type. Thus, by using journals in the journal file 50, the data file 40 can be restored correctly.

According to the restoration process in the present embodiment, by virtue of the clean point log all of journals in the journal queue 33 need not be used for restoration of the data file 40, thus making high-speed restoration possible. If, therefore, journals are written to the journal file 50, the corresponding transaction will gain success as a whole.

Figure 5:
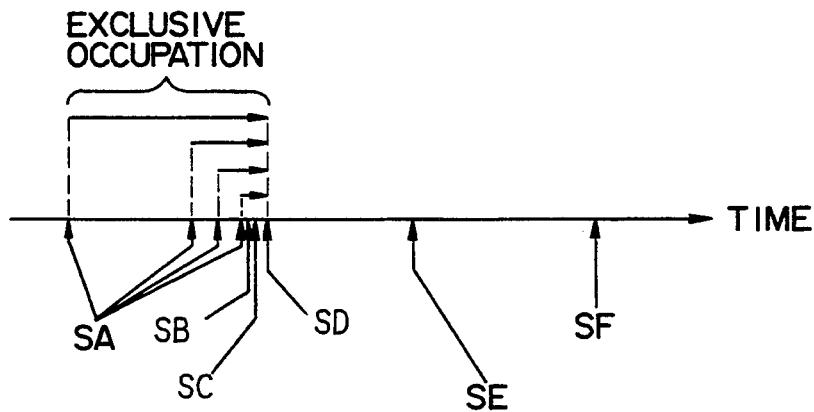

The main procedures of the journaling process in the present embodiment are illustrated in the form of a flowchart in FIG. 4 and in the form of a timing chart in FIG. 5. FIG. 5 illustrates an example in which a transaction consists of updating four pieces of data.

As can be seen from FIGS. 4 and 5, in the present embodiment, when a request for updating of data is made, exclusive occupation of the data is secured (step SA), the data is updated on the data buffer and a journal log is made or collected (step SB), the journal log is entered into the queue (step SC), the exclusive occupation of the data is released (step SD), the journal is written to the journal file (step SE), and the data on the data buffer is written to the data file and messages are transmitted to the external world (step SF).

Figure 6:
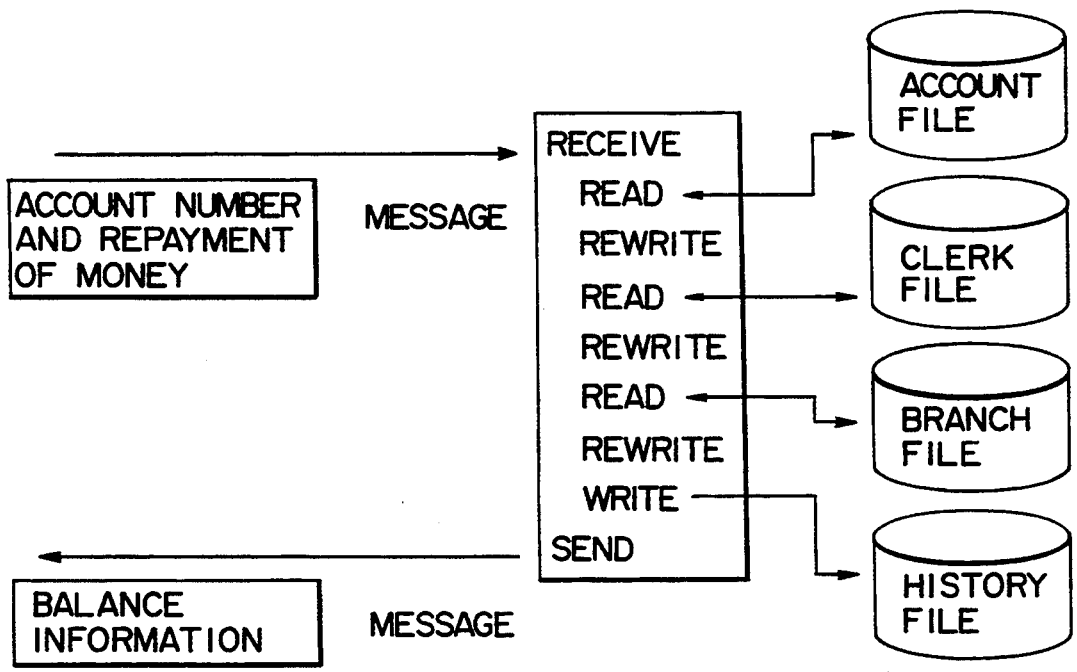
FIGS. 6 and 7 are diagrams for use in explanation of an example in which the present invention is applied to a banking online system.

Next, an application of the data management system shown in FIGS. 1 to 5 to a deposit management system used in a bank will be described with reference to FIG. 6.

The deposit management system is provided, as the data file 40, with an account file for recording the bank balance for each of accounts, a clerk file for recording receipt and repayment of deposits for each of bank clerks in charge, a branch file for recording receipt and repayment of deposits in the branch and a history file. Data on the four files are updated each time a deposit is received or repayed. The data on the four files must have consistency. Therefore, it is not absolutely allowed that some files are updated, but the remaining files are not updated. Thus, a set of corresponding data on the four files constitutes one transaction.

Figure 7:
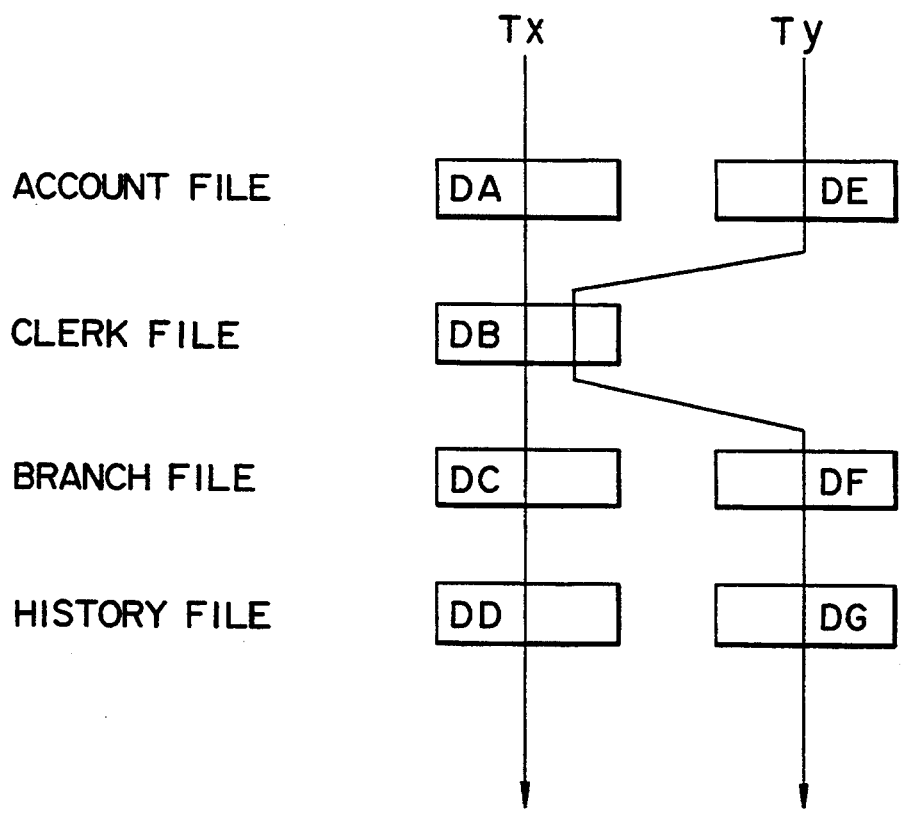

Suppose that a message that an amount of money is received in a designated account is entered from a terminal. The central processing unit 20, as shown in FIG. 7, reserves exclusive occupation of data block to be accessed in the account file, read data, update the data and collect a journal (steps S1 to S5). Next, the central processing unit 20 reserves exclusive occupation of data block to be accessed in the clerk file, reads data, updates the data and collects a journal (steps S1 to S5). Corresponding data blocks in the branch and history files are also processed likewise. Thereby, access to the four files, i.e., the transaction terminates.

Subsequently the central processing unit 20 enters journals which were collected in step S5 into the journal queue 33 and releases the exclusive occupation of the data blocks which were accessed in the four file (steps S7, S8). Thereby, another requesting program is allowed to access the four data blocks described above. Subsequently the central processing unit 20 fetches all of journals which are stored in the journal queue 33 from its top and writes them to the journal file 50 (steps S7 to S14).

Subsequently the central processing unit 20 writes updated data to the data file 40 and enters a clean point log into the last of the Journal queue 33 for the transactions whose data have been written in the data file 40 (steps S15, S16).

Furthermore, information about updated balance is transmitted to the terminal which received money.

Suppose now that, as shown in FIG. 7, a transaction TX for updating a data block DA on the account file, a data block DB on the clerk file, a data block DC on the branch file and a data block DD on the history file in sequence and a transaction TY for updating a data block DE on the account file, a data block DB on the clerk file, a data block DF on the branch file and a data block DG on the history file in sequence occur at about the same time. In this case, the data blocks DA and DE are processed concurrently. However, the transactions TX and TY are in contention for the data block DB. Supposing it is the transaction TX that accessed the data block DB first, processing of the data blocks DB, DF and DG in the transaction TY is placed in the wait state until the data block DD in the transaction TX is processed and then the exclusive occupation of the data blocks DA, DB, DC and DD is released.

As described above, in the present embodiment, the exclusive occupation of data is released each time journals are entered into the journal queue. Thus, the exclusive occupation time in the present system can be made much shorter than in the conventional system. Thereby, it also becomes possible to write many journals to the journal file in a group after they are stored in the journal queue. This will fully show the effectiveness of batch-writing journals to the journal file formed on an external storage unit. Moreover, in the present embodiment, the order in which journals are written from the journal queue to the journal file corresponds with the order of transactions. For this reason, the data file can be restored to the data-consistent state by the use of journals in the journal file even when a system failure occurs.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. An on line transaction processing method comprising the steps of:

requesting to update data on a data base having a plurality of data files which must not be inconsistent;

executing, in response to said requesting step, operations of reserving an exclusive occupation for a piece of data, updating the data and collecting a journal on updating of the data on a plurality of pieces of data, constituting one transaction, on said plurality of data files in sequence;

storing the journal collected in said executing step in a unit of transactions into a volatile memory;

releasing the exclusive occupation of the data related to the transaction in which the journal is stored into the volatile memory during said storing step;

writing the journals stored in said storage step to a non-volatile journal file in the unit of transactions after releasing of the exclusive occupation of the data; and writing updated data to said data files for transactions whose journals have been written to said non-volatile journal file, and outputting a message on updated data.

2. A data management system comprising:

reserving means for reserving an exclusive occupation state for data;

updating means for updating data whose exclusive occupation is reserved and collecting a journal;

volatile memory means for storing said journal collected by said updating means;

releasing means for releasing the exclusive occupation of the data after the storage of said journal to said volatile memory means; and means for writing said journal stored in said volatile memory means to a non-volatile journal file after the releasing of the exclusive occupation of the data by said releasing means.

3. A data management system according to claim 2, in which said reserving means and said updating means reserve exclusive occupation state of data and collect journals in sequence for a plurality of pieces of data constituting one transaction.

4. A data management system according to claim 2, in which said volatile memory means is a first-in first-out memory.

5. A data management system according to claim 2, in which said volatile memory means stores, in a group, journals on updating of a plurality of pieces of data constituting one transaction.

6. A data management system according to claim 2, in which said releasing means releases, in a group, the exclusive occupation states of a plurality of pieces of data corresponding to one transaction.

7. A data management system according to claim 2, in which said releasing means includes means for writing updated data to a data file after the writing of the journals to said non-volatile journal file.

8. A data management system according to claim 7, further comprising restoring means for restoring data in said data file using said non-volatile journal file when a system failure occurs in said data management system.

9. A data management system according to claim 8, in which said data writing means includes means for storing a clean log indicating the termination of the writing of data to said data file in said volatile memory means for a transaction in which the writing of updated data to said data file is terminated, said journal writing means writes the clean log stored in said volatile memory means to said non-volatile journal file, and said restoring means restores data on said data file only for updated data the writing of which to said data file is not completed in response to said clean log stored in said non-volatile journal file.

10. A data management system according to claim 2, further comprising:
   a journal queue for receiving the journals,
   wherein the releasing means releases the data file before any of the journals are stored in the non-volatile memory from the journal queue and before the data file is updated,
   and wherein the journals are stored in the non-volatile memory in batches.

11. A data management system equipped with a data file and a non-volatile journal file and adapted to reserve exclusive occupation of data and then update the data, comprising:
   access means for reserving exclusive occupation of data on which a request is made, executing updating of the requested data in a data buffer placed on a main storage device and collecting one or more journals;
   releasing means for storing the journals collected by said access means in a volatile first-in first-out journal queue in a unit of each transaction and releasing the exclusive occupation of data after the completion of the storing of the journals in the volatile journal queue;
   journal writing means for writing the journals stored in the volatile journal queue for each said transaction into the non-volatile journal file in the order in which the journals are stored in the volatile journal queue; and
   data writing means for writing into the data file updated data of the data buffer into the data file for each said transaction whose journals have been written in to the non-volatile journal file.

12. A data management system according to claim 11, further comprising restoring means for restoring data in said data file to have consistency using said journal file when a fault occurs in said data management system.

13. A data management system according to claim 12, in which said data writing means includes means for entering a clean point log indicating the completion of the writing of data to said data file into said journal queue for a transaction whose updated data has been written to said data file; and said journal writing means includes means for writing said clean point log entered into said journal queue to said journal file.

14. A data management system according to claim 13, in which said restoring means restors data on said data file on the basis of said clean point log stored in said journal file only for updated data the writing of which to said data file is not completed.

15. A data management system according to claim 11, in which said main memory is a volatile memory device, and said data file and said journal file are formed on external storage units each of which is formed of a nonvolatile memory device.

16. A data management system according to claim 15, in which said data file comprises a plurality of files which are related to each other and required to have consistency.

17. A data management system according to claim 11, further comprising inputting means for inputting a command to update data and outputting means for outputting a message on updated data, and in which said access means operates in response to said command from said inputting means, and said outputting means outputs said message for a transaction which occurs after the writing of data to said data file is completed by said data writing means.

18. A data management system according to claim 11, in which said access means, when data to be updated is not present on said data buffer, transfers the data from said data file to said data buffer and updates the data on said data buffer after reserving exclusive occupation of the data, and said data writing means writes updated data on said data buffer to said data file.

19. A data management system according to claim 11, further comprising means for fetching journals from said journal queue in the order in which they are entered into said queue and writing them to said journal file in the order in which they are fetched from said journal queue.

20. A data management system according to claim 11, further comprising:
   a journal queue for receiving the journals,
   wherein the releasing means releases the data file before any of the journals are stored in the non-volatile memory from the journal queue and before the data file is updated,
   and wherein the journals are stored in the non-volatile memory in batches.

* * * * *